US010706195B1

United States Patent
Rezende Barbosa et al.

(10) Patent No.: US 10,706,195 B1
(45) Date of Patent: Jul. 7, 2020

(54) SYSTEM, METHOD, AND COMPUTER PROGRAM PRODUCT FOR OVER-CONSTRAINT/DEADCODE DETECTION IN A FORMAL VERIFICATION

(71) Applicant: Cadence Design Systems, Inc., San Jose, CA (US)

(72) Inventors: Luis Humberto Rezende Barbosa, Belo Horizonte (BZ); Raquel Lara dos Santos Pereira, Belo Horizonte (BZ); Caio Alves Furtado, Belo Horizonte (BZ); Breno Augusto Dias Vitorino, Belo Horizonte (BZ); Mirlaine Aparecida Crepalde, Belo Horizonte (BZ); Rodrigo da Silva Mantini Viana, Belo Horizonte (BZ); Lucas Duarte Prates, Belo Horizonte (BZ)

(73) Assignee: Cadence Design Systems, Inc., San Jose, CA (US)

( * ) Notice: Subject to any disclaimer, the term of this patent is extended or adjusted under 35 U.S.C. 154(b) by 127 days.

(21) Appl. No.: 15/989,469

(22) Filed: May 25, 2018

(51) Int. Cl.
*G06F 17/50* (2006.01)
*G06F 30/3323* (2020.01)
*G06F 30/30* (2020.01)
*G06F 30/31* (2020.01)
*G06F 30/367* (2020.01)
*G06F 30/337* (2020.01)
*G06F 30/373* (2020.01)
*G06F 30/398* (2020.01)

(52) U.S. Cl.
CPC .......... *G06F 30/3323* (2020.01); *G06F 30/30* (2020.01); *G06F 30/31* (2020.01); *G06F 30/367* (2020.01); *G06F 30/337* (2020.01); *G06F 30/373* (2020.01); *G06F 30/398* (2020.01)

(58) Field of Classification Search
None
See application file for complete search history.

(56) References Cited

U.S. PATENT DOCUMENTS

| 5,568,396 A | * | 10/1996 | Bamji | ................ G06F 17/5081 716/122 |
|---|---|---|---|---|
| 5,581,474 A | * | 12/1996 | Bamji | ................ G06F 17/5081 703/2 |
| 5,617,510 A | * | 4/1997 | Keyrouz | ............ G06F 17/5086 706/45 |
| 5,870,608 A | * | 2/1999 | Gregory | ............... G06F 17/211 717/131 |

(Continued)

*Primary Examiner* — Leigh M Garbowski
(74) *Attorney, Agent, or Firm* — Mark H. Whittenberger, Esq.; Holland & Knight LLP

(57) ABSTRACT

The present disclosure relates to a method for use in the formal verification of an electronic circuit. Embodiments may include receiving, using a processor, a portion of an electronic circuit design and analyzing a syntactic structure of a string associated with the electronic circuit design. Embodiments may also include generating a parse tree, based upon, at least in part, the analysis and traversing the parse tree to identify one or more conditional nodes. Embodiments may further include generating a new node for each of the one or more conditional nodes and displaying, at a graphical user interface, a check, at least one of the one or more conditional nodes or the new node prior to performing either register-transfer-level RTL synthesis or final synthesis.

20 Claims, 18 Drawing Sheets

(56) References Cited

U.S. PATENT DOCUMENTS

| | | | | |
|---|---|---|---|---|
| 6,473,896 | B1* | 10/2002 | Hicken | G06F 8/20 |
| | | | | 717/125 |
| 7,007,249 | B2* | 2/2006 | Ly | G06F 17/5022 |
| | | | | 703/13 |
| 7,356,786 | B2* | 4/2008 | Schubert | G01R 31/31705 |
| | | | | 716/106 |
| 7,475,369 | B1* | 1/2009 | Lam | G06F 17/504 |
| | | | | 703/13 |
| 7,506,279 | B2* | 3/2009 | Yamada | G01R 31/31858 |
| | | | | 716/136 |
| 7,904,846 | B2* | 3/2011 | Thakur | G06F 17/5022 |
| | | | | 703/13 |
| 8,234,608 | B2* | 7/2012 | Ishikawa | G06F 17/5045 |
| | | | | 716/104 |
| 8,423,986 | B1* | 4/2013 | Grechanik | G06F 8/30 |
| | | | | 702/179 |
| 8,479,132 | B2* | 7/2013 | Tsai | G06F 17/5045 |
| | | | | 716/111 |
| 9,721,058 | B2* | 8/2017 | Sarwary | G06F 17/5081 |
| 10,372,854 | B2* | 8/2019 | Tsai | G06F 17/5045 |
| 2001/0037492 | A1* | 11/2001 | Holzmann | G06F 11/3608 |
| | | | | 717/128 |
| 2003/0167457 | A1* | 9/2003 | Thompson | G06F 8/443 |
| | | | | 717/109 |
| 2010/0251226 | A1* | 9/2010 | Sato | G06F 8/443 |
| | | | | 717/146 |
| 2013/0339930 | A1* | 12/2013 | Xu | G06F 11/3684 |
| | | | | 717/125 |

* cited by examiner c) Deadcode checks included in parse tree

SYSTEM, METHOD, AND COMPUTER PROGRAM PRODUCT FOR OVER-CONSTRAINT/DEADCODE DETECTION IN A FORMAL VERIFICATION

FIELD OF THE INVENTION

The present disclosure relates to electronic design verification, and more specifically, to a method for over-constraint/deadcode detection in a formal verification.

DISCUSSION OF THE RELATED ART

The electronic design automation ("EDA") market segment is recently growing due to high interest in areas such as mobility, automotive, Internet of Things ("IOT") and cloud computing. These new opportunities increase the number of new semiconductor-based products developed, and with it, the necessity to test them.

One of the problems that can occur during integrated circuit ("IC") development is the introduction of deadcode in register-transfer-level ("RTL"), that is, a logic inside the circuit that will never be reached during operation. This might be introduced, for example, due to design constraints. There are different methods to discover deadcode using simulation, but they are costly since the discovery process must do exhaustive searches into the RTL. Also, finding deadcode is possible using formal verification, through the insertion of automatic deadcode checks during later stages of compilation process. However, this approach also has a high code maintenance cost since it is intrusive to the compilation process, inserts duplicated logic, is error prone, and may introduce compilation performance degradation. Additionally, the user cannot visualize nor interact with these checks until the full design compilation process is completed, which can take hours for large designs.

SUMMARY OF DISCLOSURE

In one or more embodiments of the present disclosure, a computer-implemented method for use in a formal verification of an electronic design is provided. The method may include receiving, using a processor, a portion of an electronic circuit design and analyzing a syntactic structure of a string associated with the electronic circuit design. The method may also include generating a parse tree, based upon, at least in part, the analysis and traversing the parse tree to identify one or more conditional nodes. The method may further include generating a new node for each of the one or more conditional nodes and displaying, at a graphical user interface ("GUI"), a preview of a check associated with, at least one of the one or more conditional nodes or the new node prior to performing either register-transfer-level RTL synthesis or final synthesis.

One or more of the following features may be included. In some embodiments, the string may be based upon, at least in part, a grammar corresponding to a set of rules used to describe all possible strings of a programming language. The portion of an electronic circuit design may include an HDL file. The one or more conditional nodes may represent at least one of a then path and an else path. The new node may correspond to an automatic reachability check. The parse tree may include at least one deadcode check. The method may include allowing a user to filter, using the graphical user interface, the at least one deadcode check.

In one or more embodiments of the present disclosure a computer-readable storage medium having stored thereon instructions, which when executed by a processor result in one or more operations is provided. Operations may include receiving, using a processor, a portion of an electronic circuit design and analyzing a syntactic structure of a string associated with the electronic circuit design. Operations may also include generating a parse tree, based upon, at least in part, the analysis and traversing the parse tree to identify one or more conditional nodes. Operations may further include generating a new node for each of the one or more conditional nodes and displaying, at a graphical user interface, a preview of a check associated with, at least one of the one or more conditional nodes or the new node prior to performing either register-transfer-level RTL synthesis or final synthesis.

One or more of the following features may be included. In some embodiments, the string may be based upon, at least in part, a grammar corresponding to a set of rules used to describe all possible strings of a programming language. The portion of an electronic circuit design may include an HDL file. The one or more conditional nodes may represent at least one of a then path and an else path. The new node may correspond to an automatic reachability check. The parse tree may include at least one deadcode check. Operations may include allowing a user to filter, using the graphical user interface, the at least one deadcode check.

In one or more embodiments of the present disclosure, a system for electronic design verification is provided. The system may include one or more processors configured to receive, using a processor, a portion of an electronic circuit design and to analyze a syntactic structure of a string associated with the electronic circuit design. The at least one processor may be further configured to generate a parse tree, based upon, at least in part, the analysis. The at least one processor may be further configured to traverse the parse tree to identify one or more conditional nodes and to generate a new node for each of the one or more conditional nodes. The at least one processor may be further configured to display, at a graphical user interface, a preview of a check associated with, at least one of the one or more conditional nodes or the new node prior to performing either register-transfer-level RTL synthesis or final synthesis.

One or more of the following features may be included. In some embodiments, the string may be based upon, at least in part, a grammar corresponding to a set of rules used to describe all possible strings of a programming language. The portion of an electronic circuit design may include an HDL file. The one or more conditional nodes may represent at least one of a then path and an else path. The new node may correspond to an automatic reachability check. The parse tree may include at least one deadcode check. The at least one processor may be further configured to allow a user to filter, using the graphical user interface, the at least one deadcode check.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
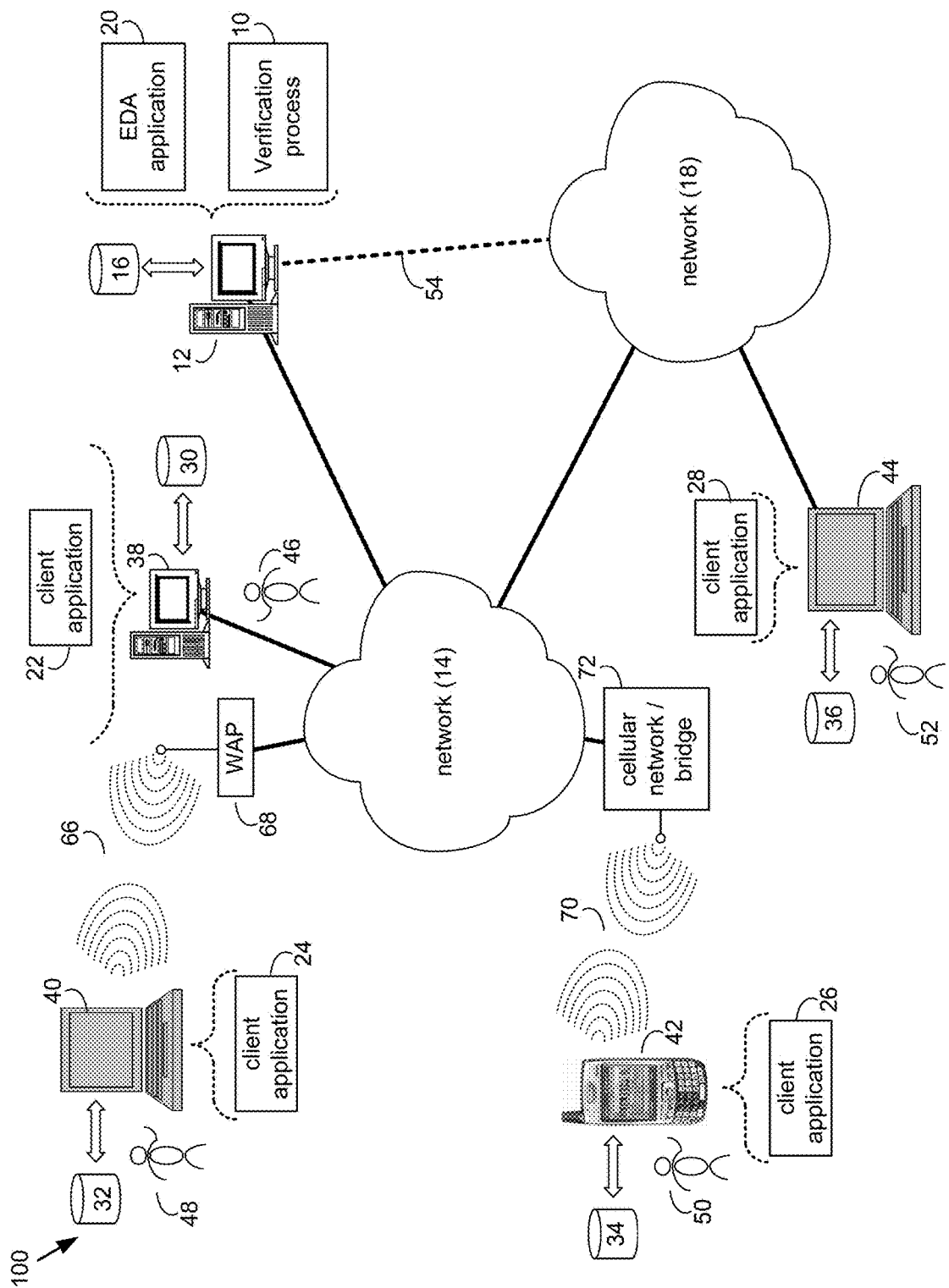
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Verification process 10 may be a stand alone application, or may be an applet/application/script that may interact with and/or be executed within EDA application 20. In addition/ as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
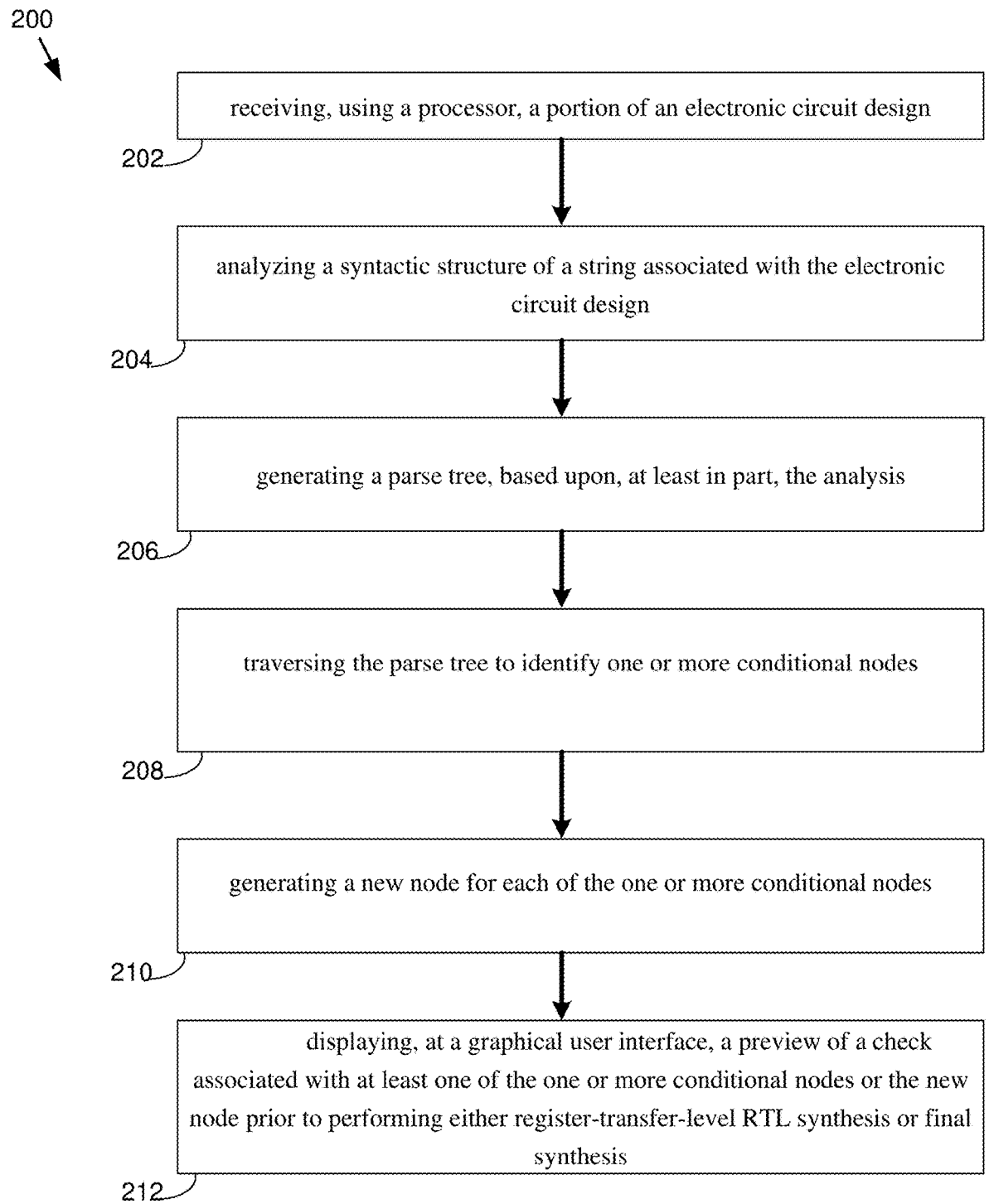
FIG. 2 is a flowchart depicting operations consistent with the verification process in accordance with an embodiment of the present disclosure.

Referring now to FIG. 2, an exemplary flowchart 200 depicting operations consistent with verification process 10 is provided. Operations may include receiving (202), using a processor, a portion of an electronic circuit design and analyzing (204) a syntactic structure of a string associated with the electronic circuit design. Embodiments may also include generating (206) a parse tree, based upon, at least in part, the analysis and traversing (208) the parse tree to identify one or more conditional nodes. Embodiments may further include generating (210) a new node for each of the one or more conditional nodes and displaying (212), at a graphical user interface, a preview of a check associated with, at least one of the one or more conditional nodes or the new node prior to performing either register-transfer-level RTL synthesis or final synthesis.

As used herein, the term "deadcode" may refer to a part of the RTL code that may never be executed because there is no control flow that leads to its execution. It is undesirable because useless logic is synthesized, potentially increasing the chip cost, or it represents a bug in the RTL. There are two types of deadcode, static and dynamic. Static deadcode is unconditionally unreachable and may be detected by lint checks. Dynamic deadcode depends upon the design constraints and operation mode but is usually hard to find. Compilers can detect and remove (optimize) some cases of static deadcode from the design, however, in these cases the deadcode is not synthesized at all.

Figure 3:
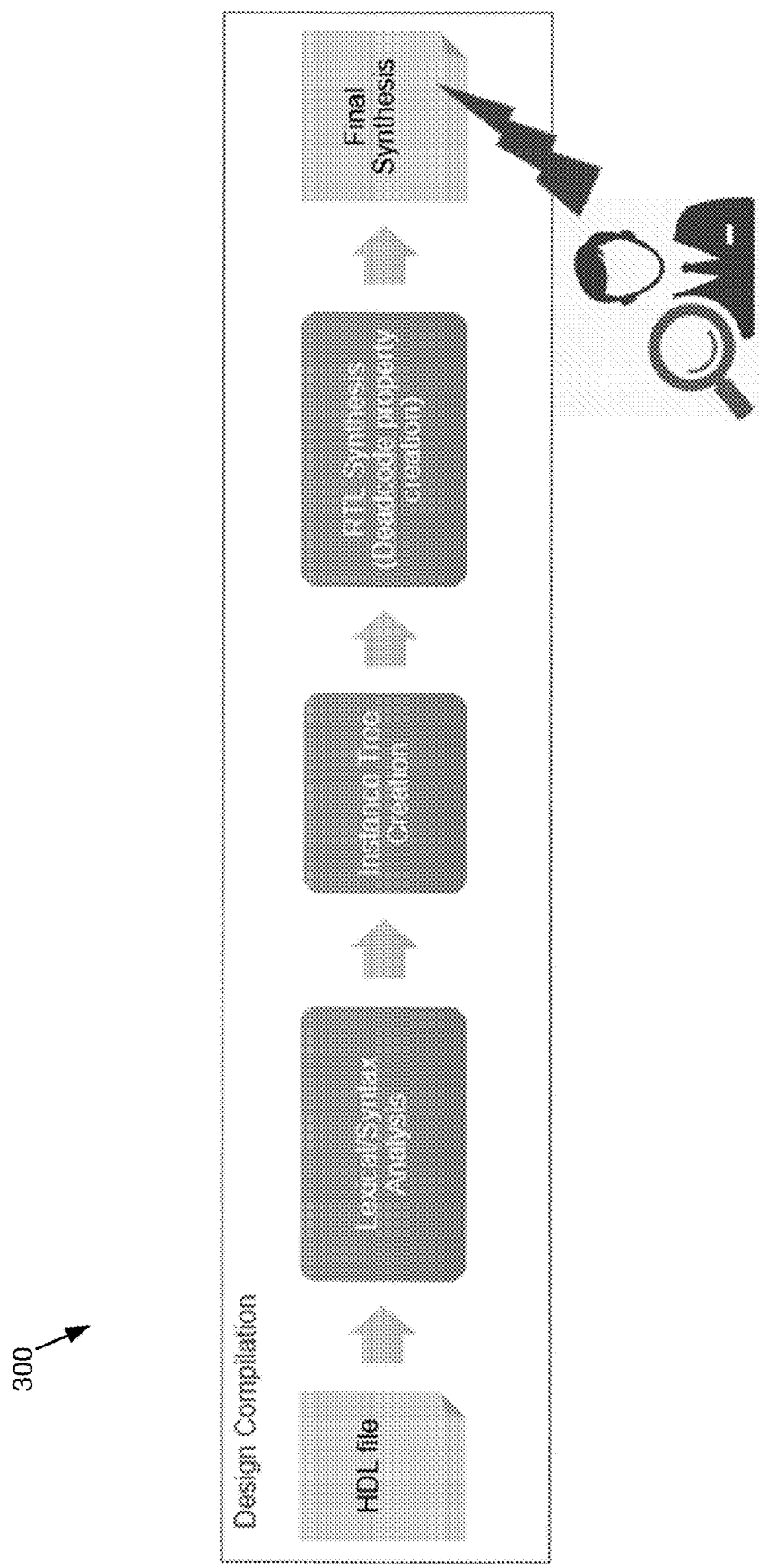
FIG. 3 is a schematic consistent with the verification process in accordance with an embodiment of the present disclosure.

Referring now to FIG. 3, an existing approach for electronic circuit design is provided. Finding deadcode is possible using formal verification, through the insertion of automatic checks during later stages of compilation process. However, this approach also has a high code maintenance cost since it is intrusive to the compilation process, inserts duplicated logic, is error prone, and may introduce compilation performance degradation. Additionally, the user cannot visualize nor interact with these checks until the full design compilation process is completed, which can take hours for large designs.

The conventional methodology adds the automatic deadcode checks during the synthesis flow in an intrusive way. Customized code ("hooks") are inserted into points of interest inside the compiler code, for example, in 'branch conditions' synthesis. These hooks create the additional logic necessary for the synthesized checks, using low-level synthesis components available in the tool. Subsequently, this additional logic becomes part of the normal synthesis flow, and is impacted by further post-processing performed by the compiler. As the synthesis process is a monolithic process, no user interaction is possible until the synthesis is done. In this example, the HDL condition expression might have to be evaluated again for each deadcode check, to avoid impacting on the normal synthesis flow. Moreover, the extra logic insertion is intrusive; modifying the synthesis flow to include the checks. This process creates a non-negligible performance hit in the overall design compilation time. Users must also wait for the entire synthesis process to complete until they can interact with the automatic deadcode checks.

Figure 4:
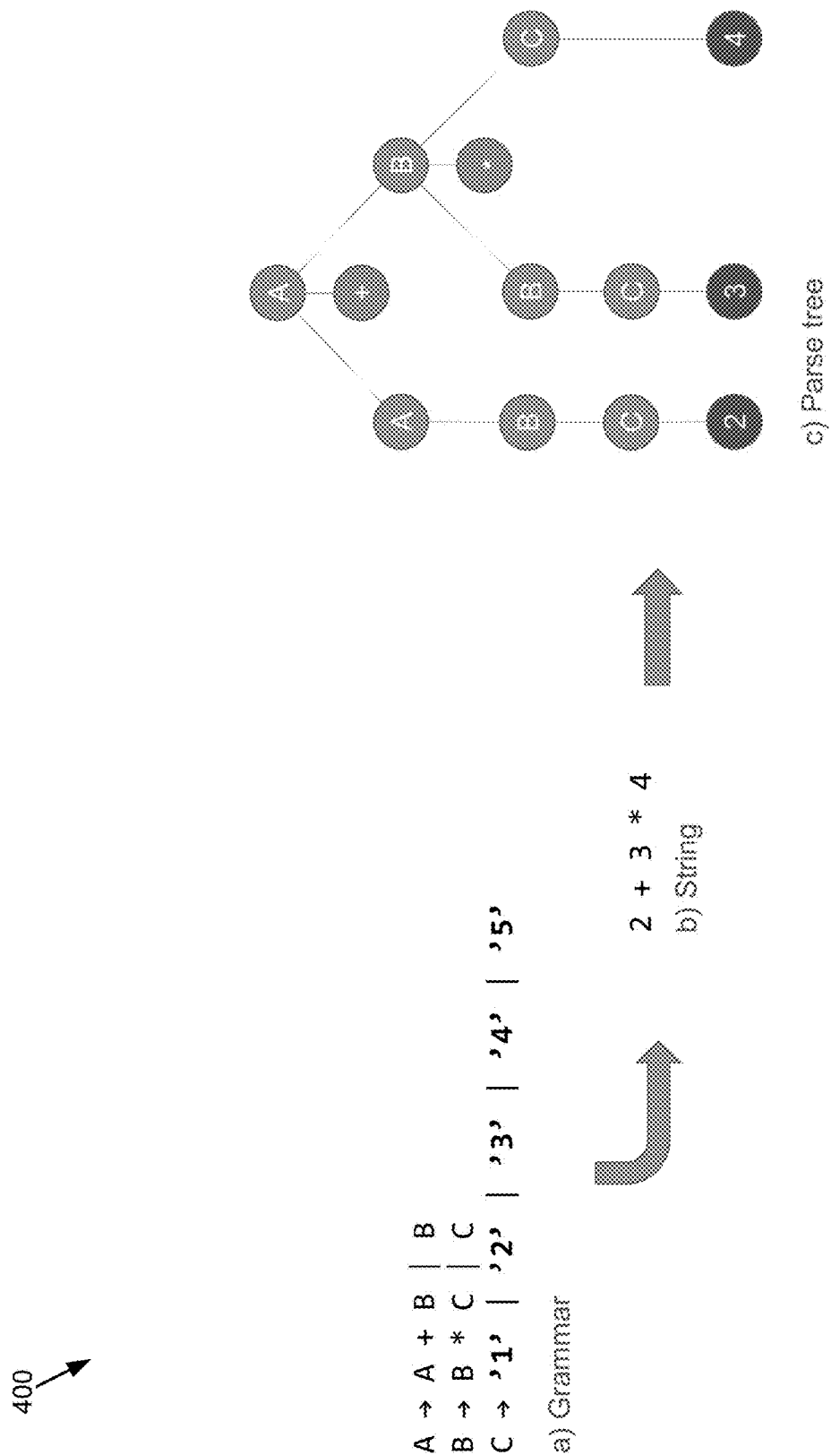
FIG. 4 is a schematic consistent with the verification process in accordance with an embodiment of the present disclosure.

Referring now to FIG. 4, an embodiment showing an example 400 of a parse tree is provided. As used herein, the phrase "parse tree" may refer to a hierarchical representation of the syntactic structure of a string, which may be based on a grammar. The term "grammar" may refer to the set of rules used to describe all possible strings of a language. The parse tree may be the output from the lexical/syntactical analysis of HDL files as shown in FIG. 3. In some embodiments, a parse tree may be generated during a command of an EDA application such as EDA application 20, for example, transforming the user's input (e.g. Verilog or VHDL file) into a tree of tokens. The parse tree may be used by EDA application 20 to create the internal representation of the design.

Accordingly, and referring now to FIGS. 5-18, embodiments of verification process 10 may provide a new method to verify deadcode using formal verification. Verification process 10 may be configured to allow for the insertion of automatic reachability checks (formal properties) in an early phase of design compilation, for example, in the parser phase. As such, verification process 10 may provide numerous advantages over prior systems. These include, but are not limited to, eliminating any requirement of modifying the synthesis flow, which makes embodiments of verification process 10 easier to maintain, and thus avoids the insertion of duplicated logic. Thus, the automatic property complexity involved in verification process 10 is low, which promotes better performance than the conventional method.

Additionally and/or alternatively, verification process 10 may allow a user to view a preview about the checks before the entire synthesis process, since they may be added in the begin of design compilation flow.

Figure 5:
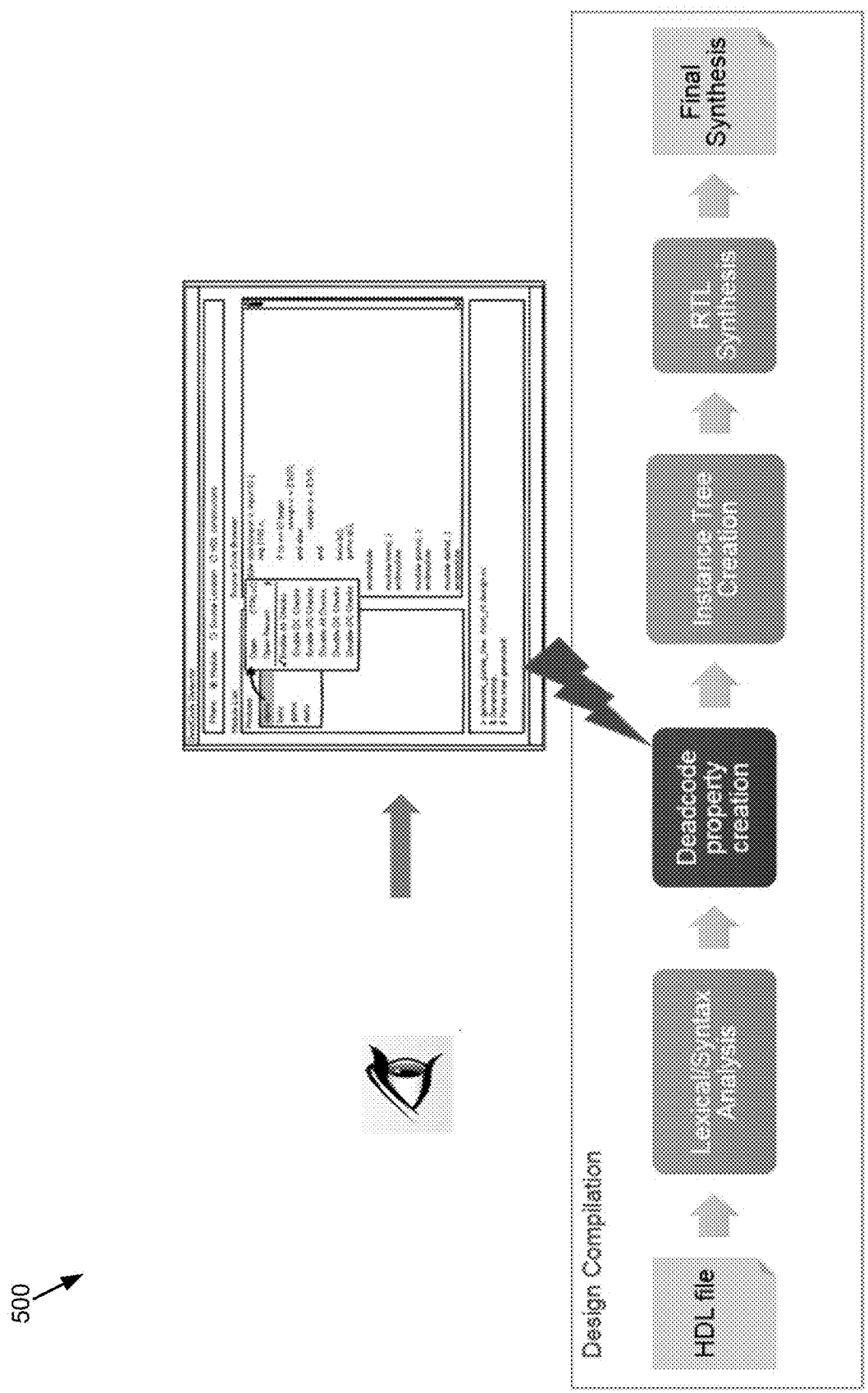
FIG. 5 is an example of a graphical user interface consistent with the verification process in accordance with an embodiment of the present disclosure.

In some embodiments, and as shown in FIG. 5, embodiments of verification process 10 may include a new step after the lexical/syntax analysis of the electronic design, which may be referred to herein as deadcode property creation. This may include traversing through all the nodes (e.g., branch nodes) of the parse tree and for each node found during traversal the process may include identifying the nodes that represent "then" and "else" paths. The one or more branch nodes may represent at least one of the possible paths. Branch nodes can be conditional nodes, case nodes, loop control nodes, module instantiation nodes, and any node that represents a change in the flow. In the case of conditional node, it represents at least one of a then path and an else path.

Under the "then" and "else" nodes the process may include adding a new node that represents "cover(1)" statement. In some embodiments, each of these new nodes may represent one automatic reachability check. They may be inspected or waived by the user before the actual synthesis starts. The default synthesis process may create the logic for the new reachability check nodes. Embodiments of verification process 10 may be expanded to handle other coverage models, including, but not limited to, branch, statement, and/or expression models.

In some embodiments, the design compiler included within verification process 10 may include two distinct phases. At the first phase, and as shown in FIG. 5, it may read the design files, written in HDL, and output a parse tree. This parse tree may include all the tokens identified in the one or more HDL files, all hierarchically organized according to the HDL grammar. At the second phase, the compiler may read this parse tree, and output a gate level representation of this design. The second phase synthesizes the circuit that was specified in HDL.

Figure 6:
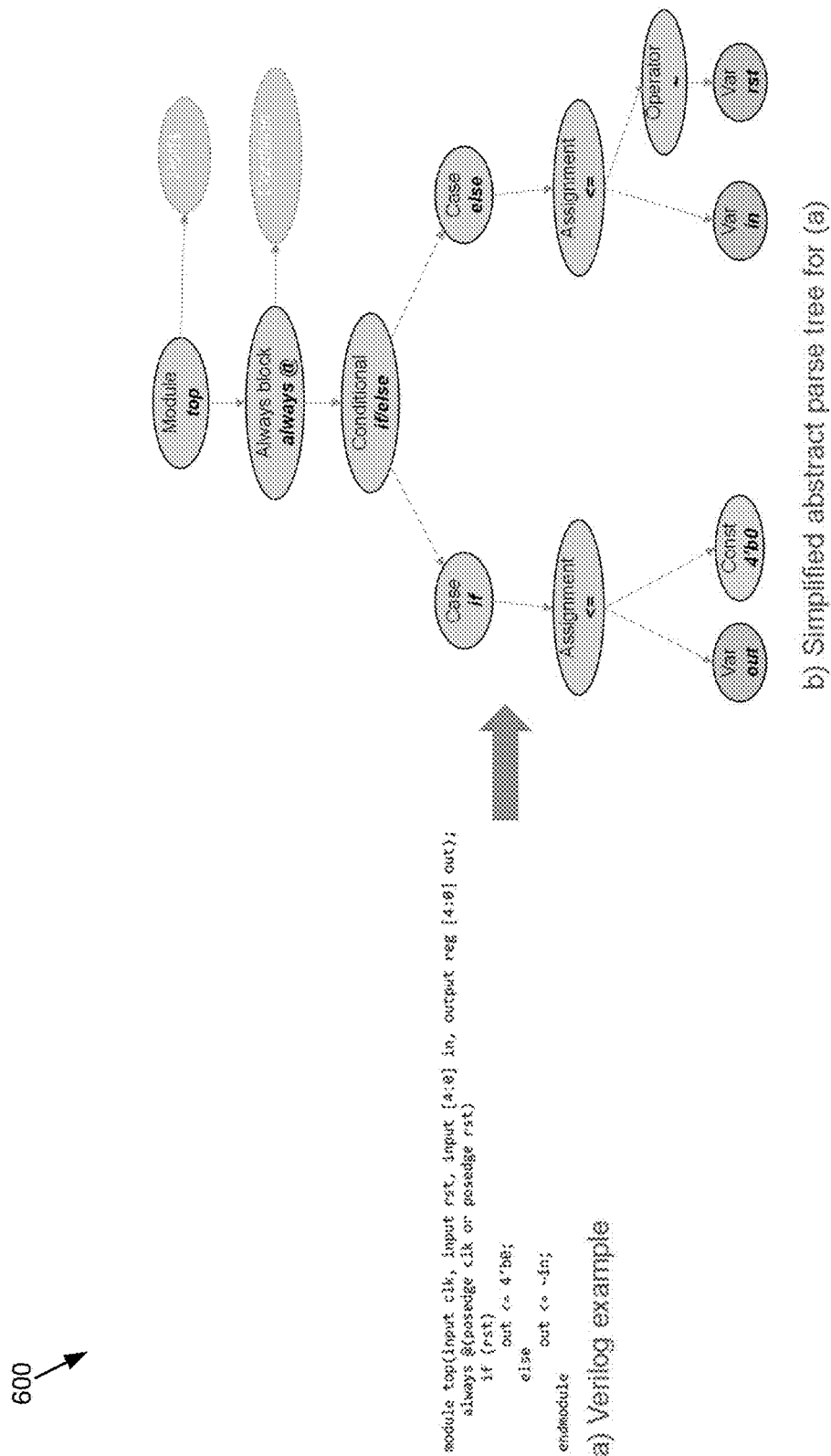
FIG. 6 is a schematic consistent with the verification process in accordance with an embodiment of the present disclosure.
Figure 7:
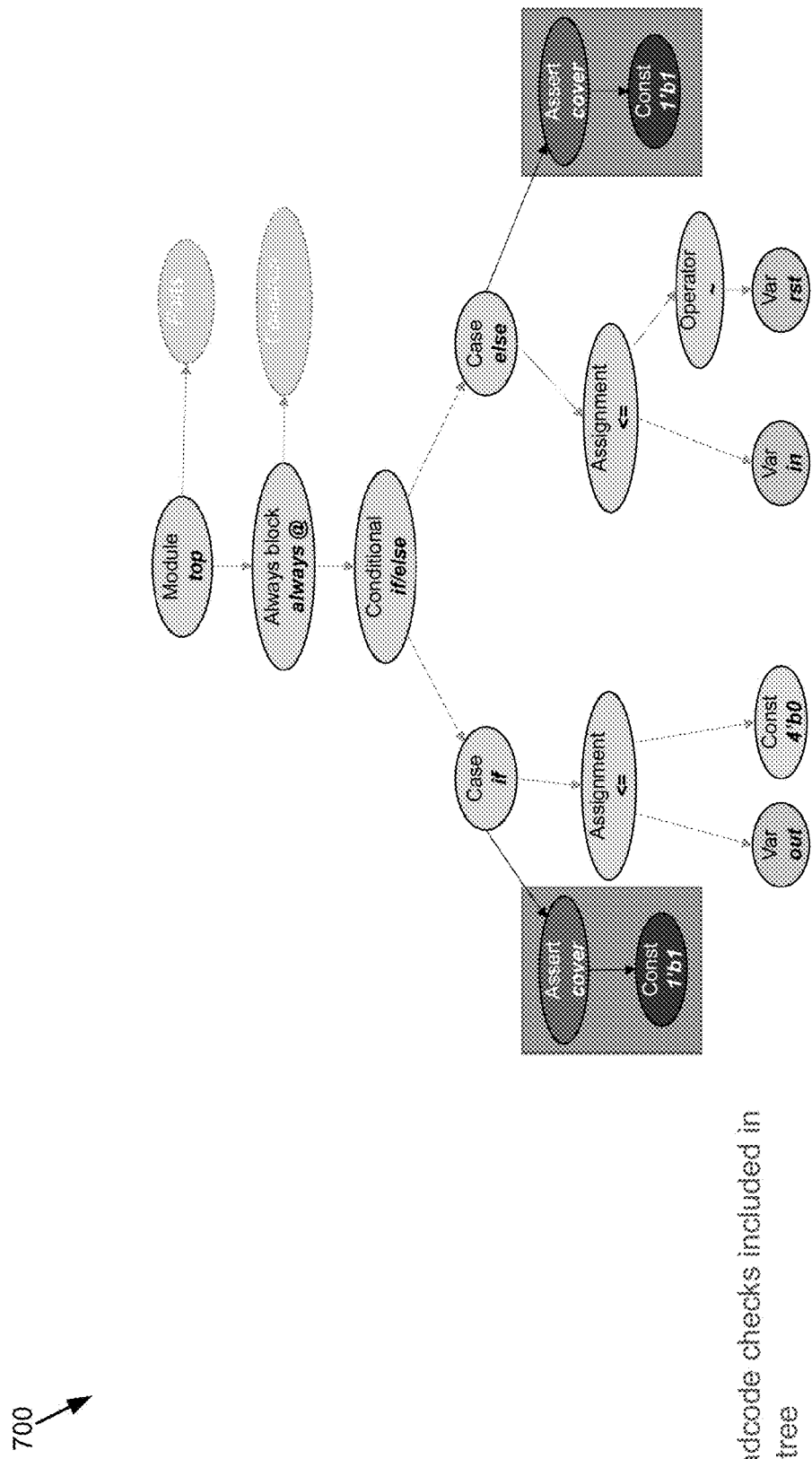
FIG. 7 is a schematic consistent with the verification process in accordance with an embodiment of the present disclosure.

Embodiments of verification process 10 may operate between the first and second phases. In this way, verification process 10 may modify the parse tree structure, adding the cover properties in the parse tree. Moreover, the cover expression may be the same for all properties: a simple "true" boolean expression. FIGS. 6-7 provide a comparison of previous approaches (e.g. FIG. 6) with that of verification process 10 (e.g. FIG. 7).

In some embodiments, the cover properties may be introduced under each conditional branch node in the parse tree. Each cover property checks if that particular conditional branch is reachable by any set of values assigned to the signals that belong to that branch's condition. Identifying these nodes may be possible by traversing all parse tree nodes, selecting only these node types.

In some embodiments, each cover property expression may be a simple "true" expression. Verification process 10 may position the cover property inside the branch that it is supposed to check for. Therefore, the conventional property synthesis flow automatically considers the branch's condition that should be active for that cover.

Figure 8:
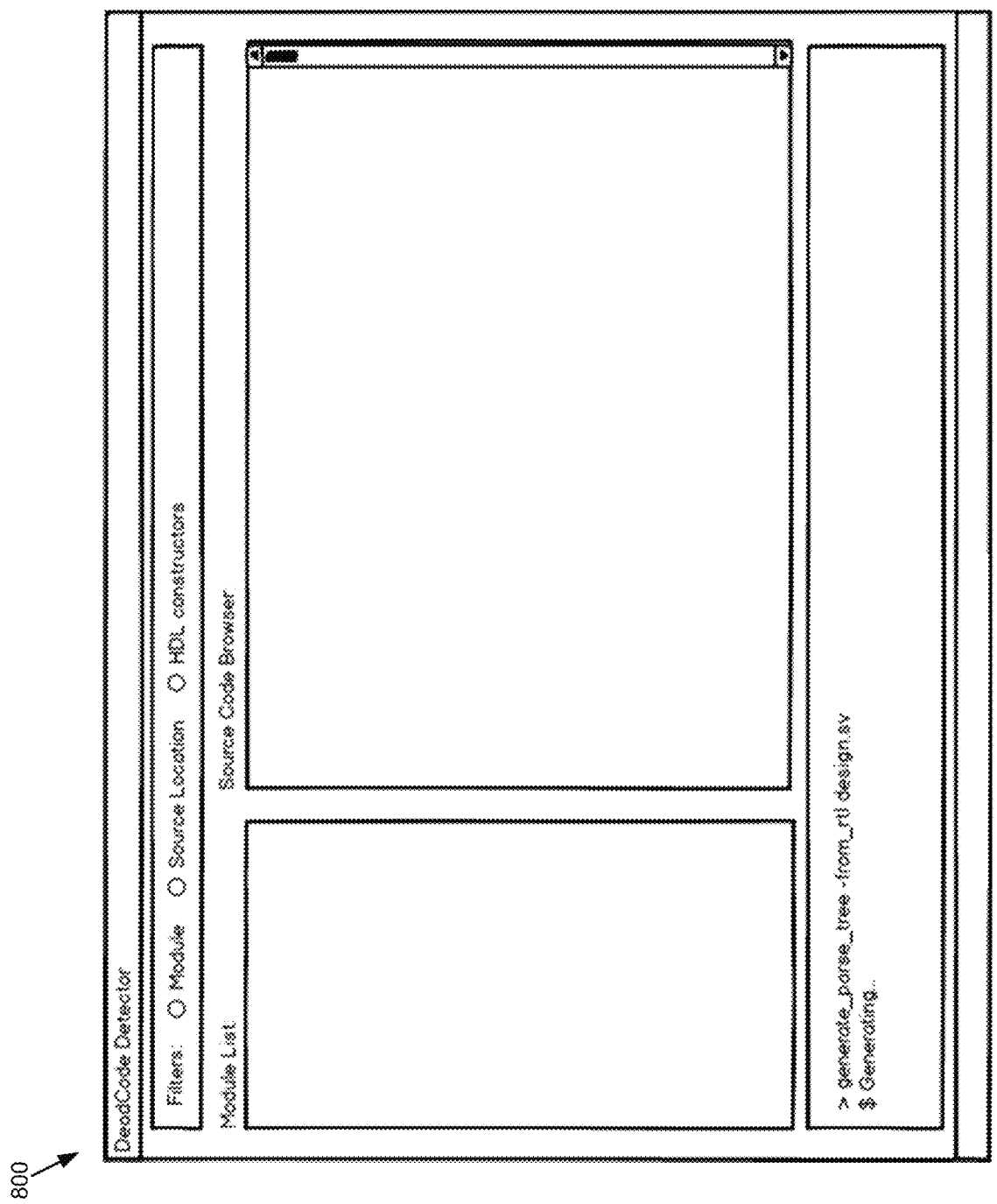
FIG. 8 is an example of a graphical user interface consistent with the verification process in accordance with an embodiment of the present disclosure.

Referring now to FIGS. 8-18, embodiments of verification process 10 showing a variety of graphical user interfaces are provided. FIG. 8 depicts a graphical user interface 800 showing a deadcode detector that may be used in accordance with verification process 10. In this example, the user may first analyze the RTL using an RTL compiler and may create its associated Parse Tree. The Parse Tree may be the initial data structure that will enable the deadcode generation. In some cases, there may not be deadcode/over constraint ("DC/OC") checks created yet.

Figure 9:
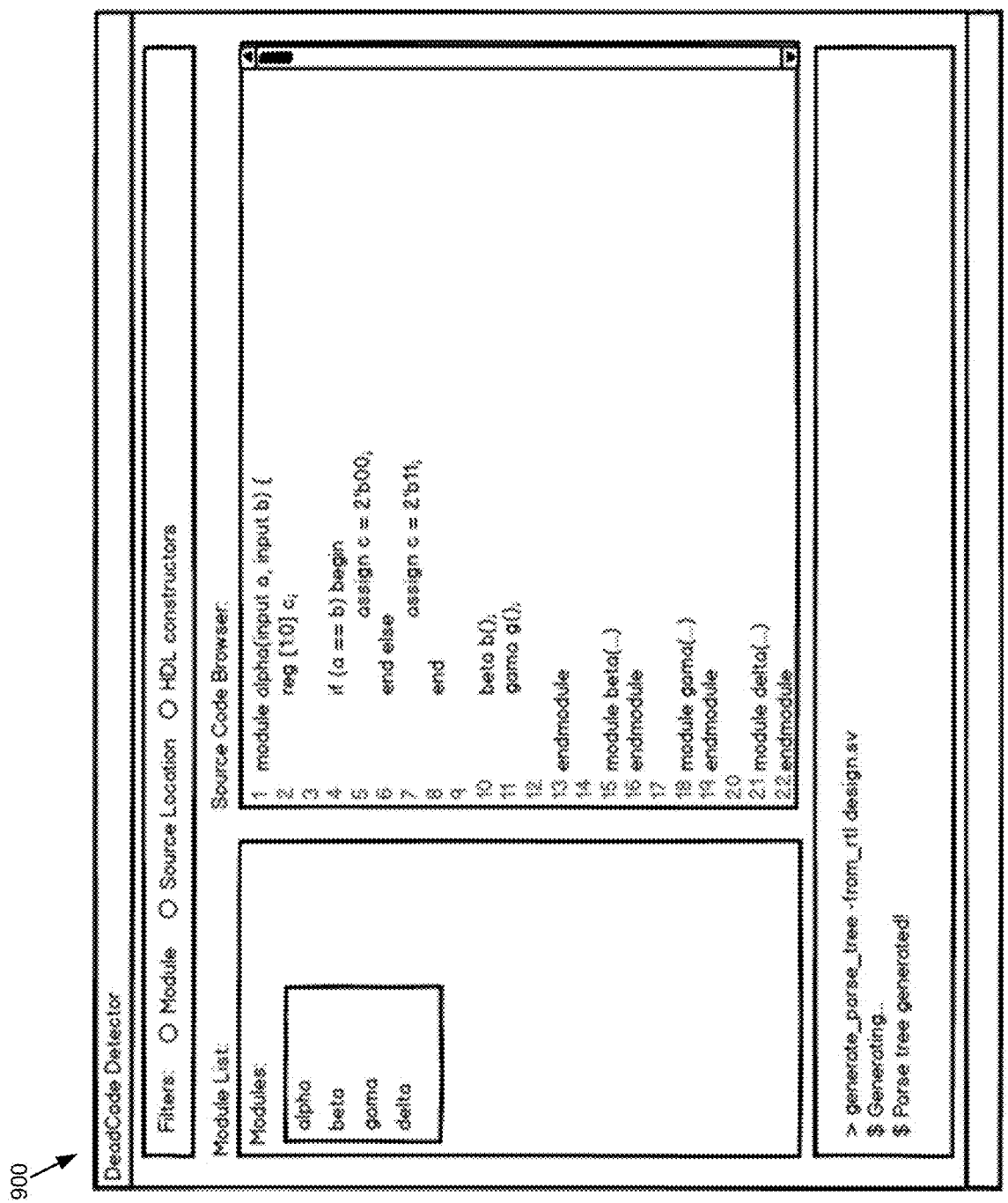
FIG. 9 is an example of a graphical user interface consistent with the verification process in accordance with an embodiment of the present disclosure.
Figure 10:
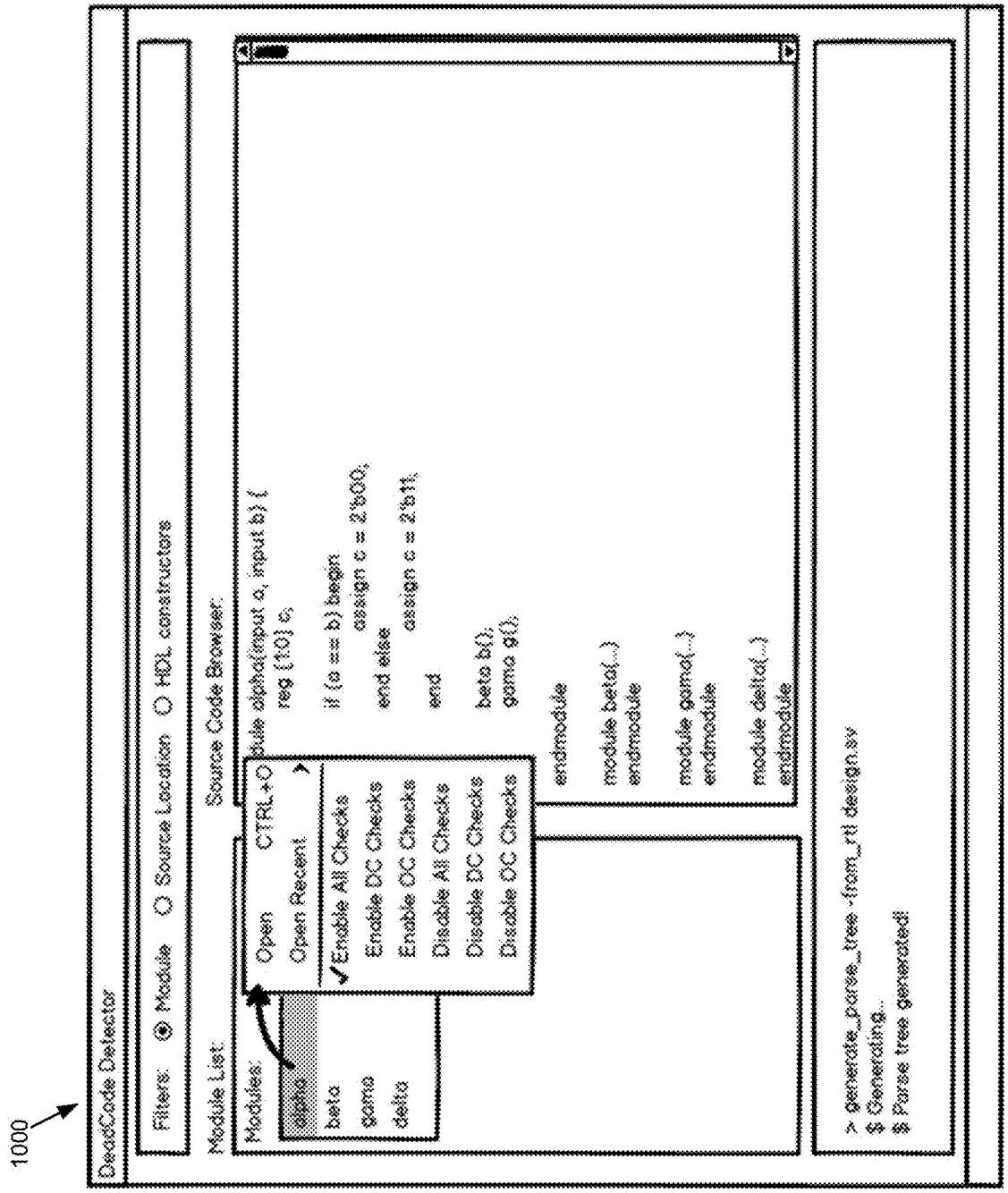
FIG. 10 is an example of a graphical user interface consistent with the verification process in accordance with an embodiment of the present disclosure.

In some embodiments, once the RTL is analyzed, the design may be loaded in the deadcode detector GUI 900 as shown in FIG. 9. GUI 900 may include a list of analyzed modules (e.g., alpha, beta, gamma, delta, etc.) as no instance tree is available yet. GUI 900 may further include a source code browser GUI, a list of available DC/OC filters, etc.

In some embodiments, once the RTL is analyzed, verification process 10 may allow the user to define and or select which checks they want to be fully synthesized. This may be achieved using any suitable technique, such as using popup menu of GUI 1000 of FIG. 10. Specifically, the user may define the checks for the full design or for just a set of modules. Additionally and/or alternatively, the user may also define what type of check he/she wants to create.

Figure 11:
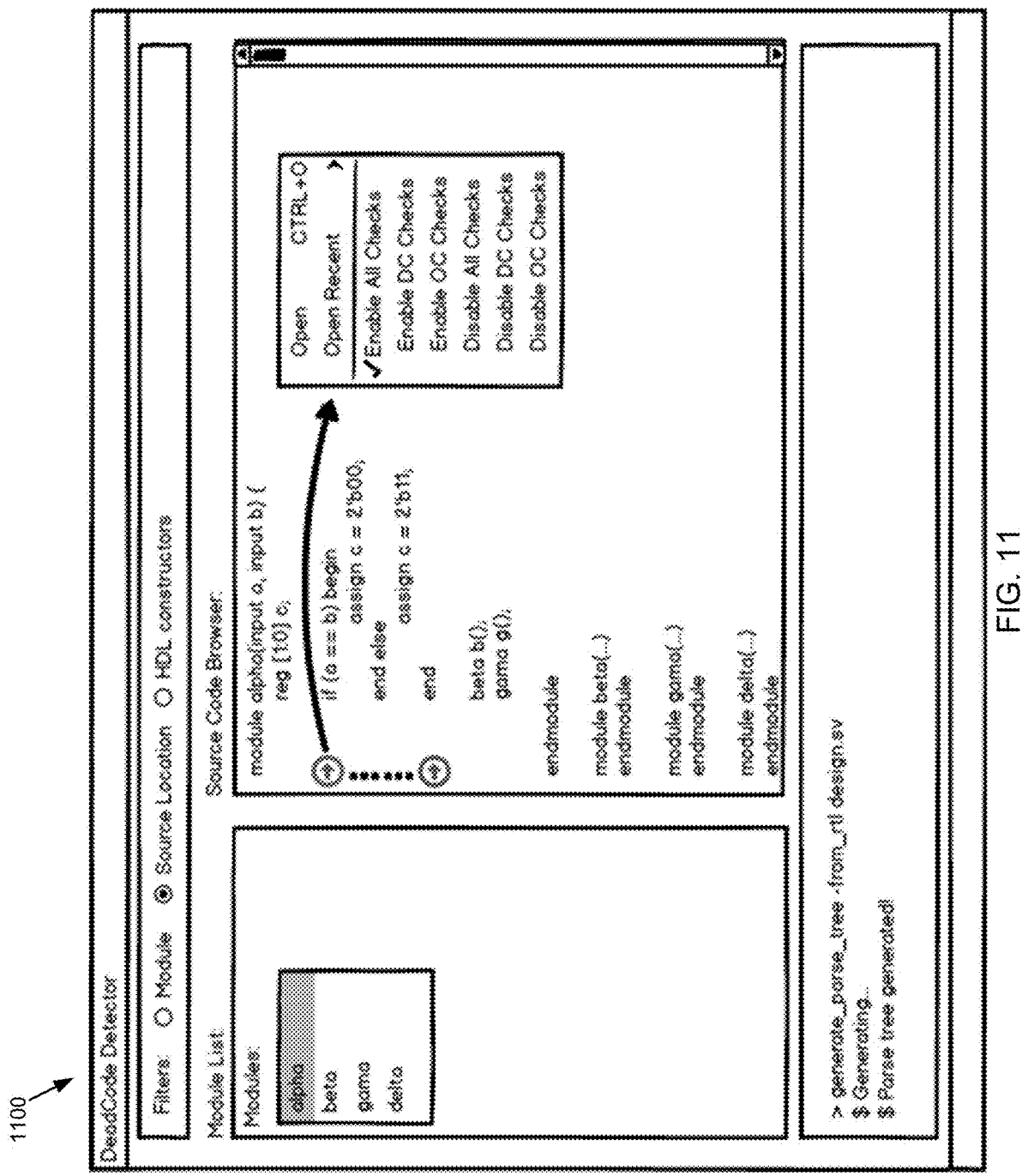
FIG. 11 is an example of a graphical user interface consistent with the verification process in accordance with an embodiment of the present disclosure.

In some embodiments, for example using the GUI 1100 of FIG. 11, verification process 10 may allow a user to define and/or select just a segment in the RTL to enable/disable the DC/OV check creation. Accordingly, this may allow the user to partially enable the check creation inside an RTL code without having to modify his/her RTL using pragmas.

Figure 12:
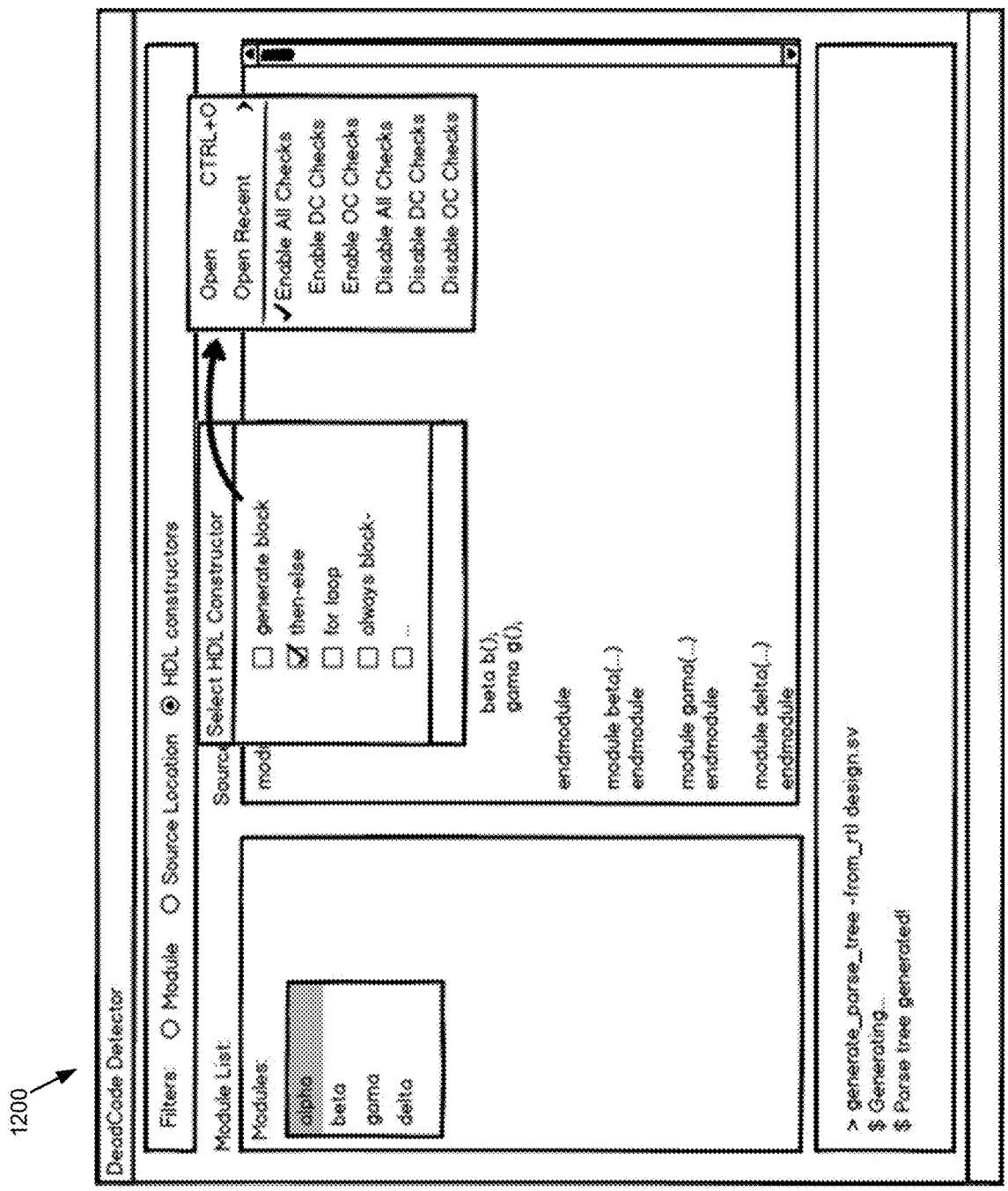
FIG. 12 is an example of a graphical user interface consistent with the verification process in accordance with an embodiment of the present disclosure.

In some embodiments, for example using the GUI 1200 of FIG. 12, verification process 10 may allow a user to continue to use more features to define different types of checks that may be generated. Accordingly, the user may define the checks according to the type of the HDL statement, some of which may include but are not limited to, generate blocks, if-then-else, for statements, always blocks, etc. In this way, and by using GUI 1200, it may be possible to obtain metrics about the number of checks that might be generated. These metrics may be filtered by the same filtering mechanisms discussed earlier for this GUI. At this point, metrics may be an estimation.

Figure 13:
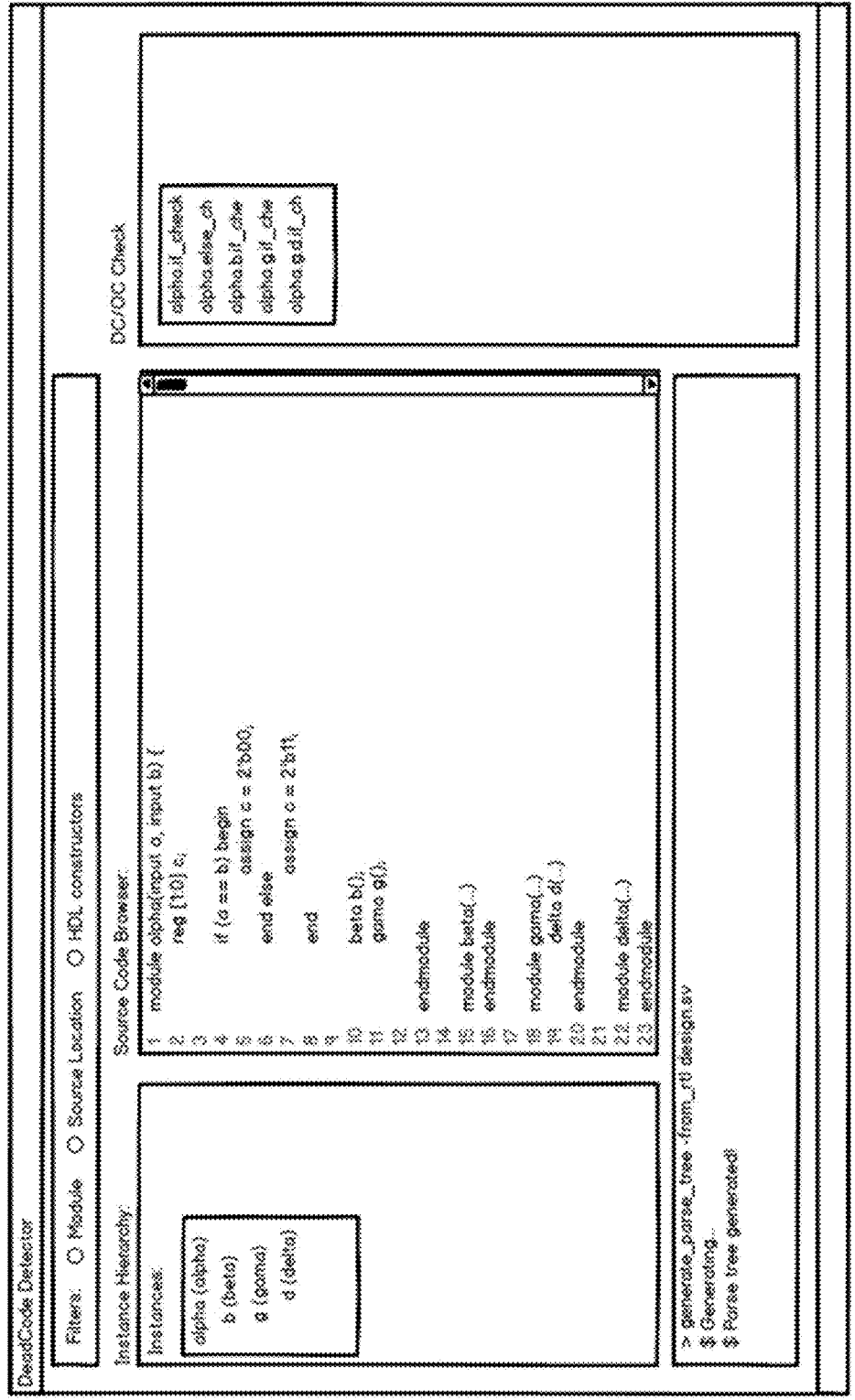
FIG. 13 is an example of a graphical user interface consistent with the verification process in accordance with an embodiment of the present disclosure.
Figure 14:
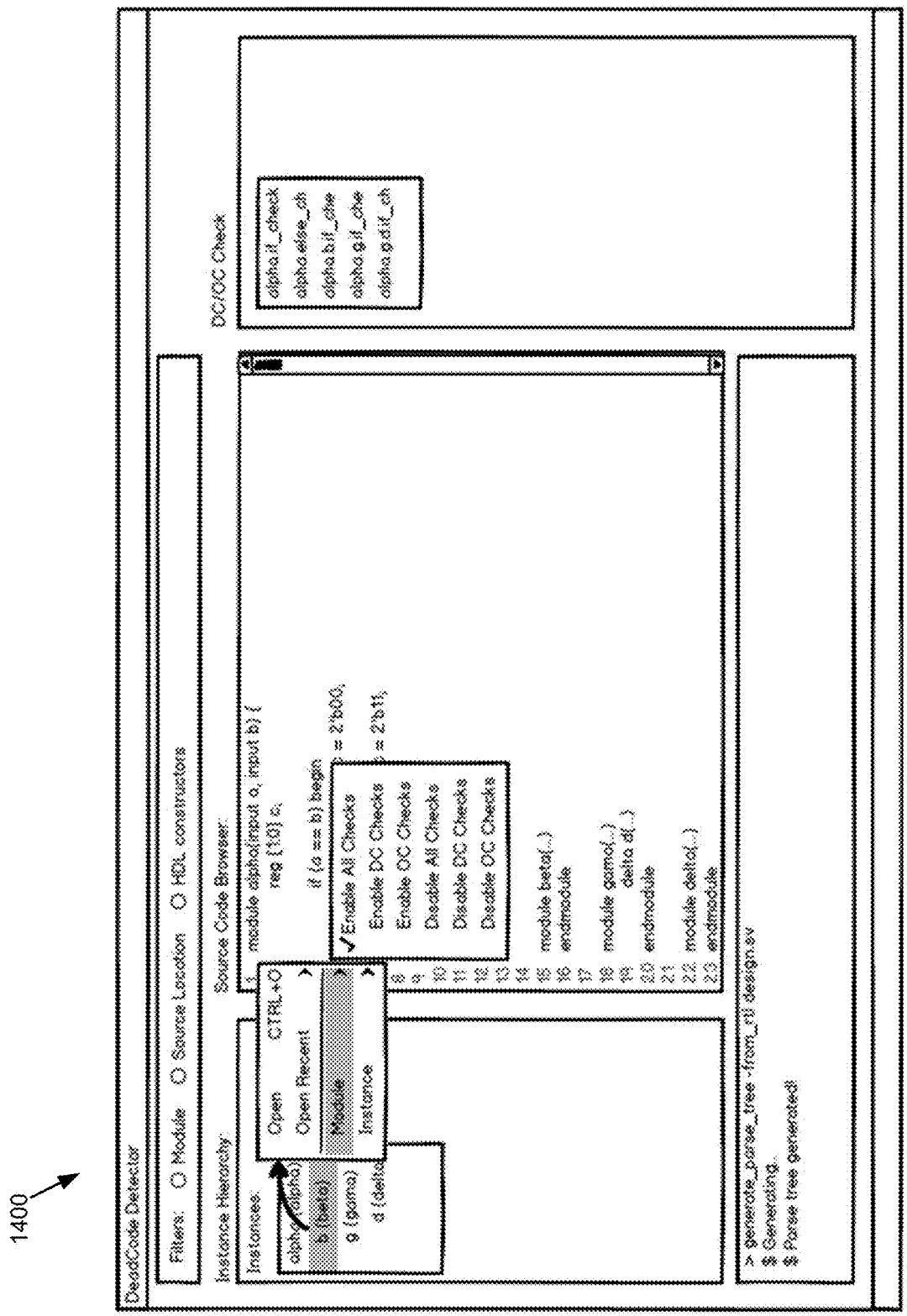
FIG. 14 is an example of a graphical user interface consistent with the verification process in accordance with an embodiment of the present disclosure.

In some embodiments, for example using the GUI 1300 of FIG. 13, a deadcode detector hierarchical view may be provided. Once the hierarchical tree is constructed, the design instance tree representation of the design may be loaded in the deadcode detector GUI 1300. This screen may include, but is not limited to, a hierarchical view of the design, source browser GUI, a list of available DC/OC filters, and a list of DC/OC checks available per instance. In some cases, this pane of the GUI may be automatically updated depending on the instance selected on the hierarchical view.

Figure 15:
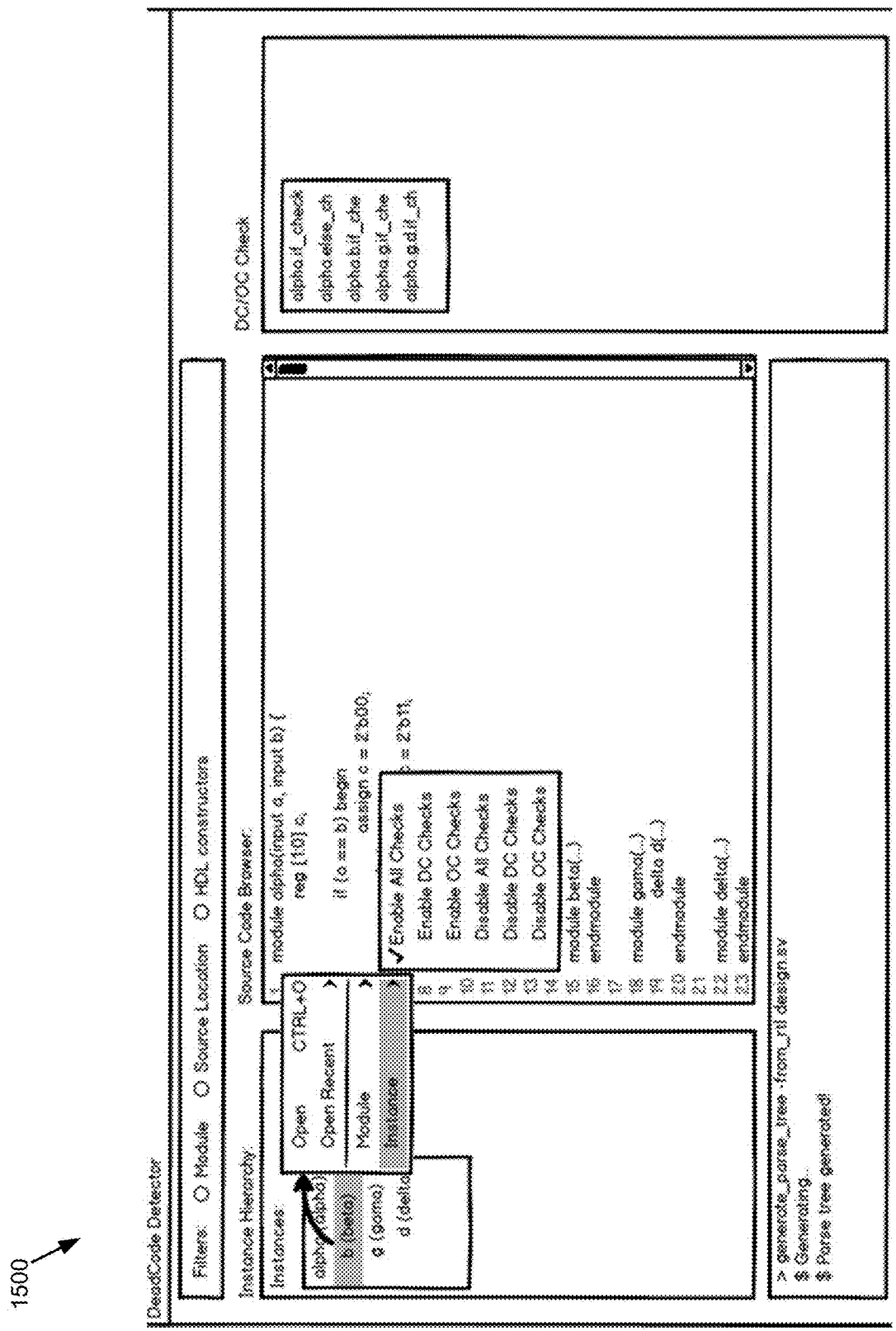
FIG. 15 is an example of a graphical user interface consistent with the verification process in accordance with an embodiment of the present disclosure.
Figure 16:
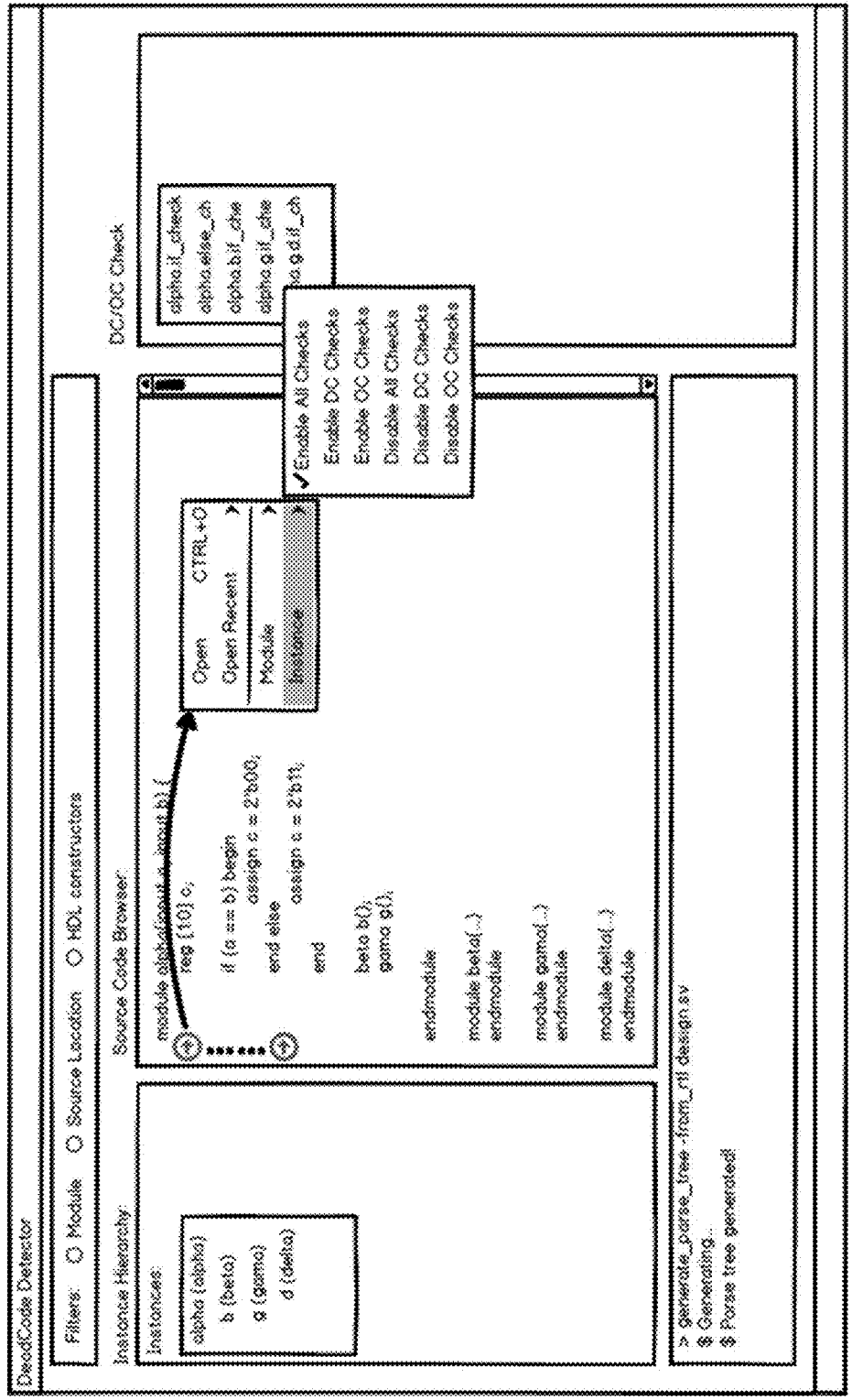
FIG. 16 is an example of a graphical user interface consistent with the verification process in accordance with an embodiment of the present disclosure.

In some embodiments, verification process 10 may allow a user to continue to define which checks he/she wants to be created. This may be achieved with a popup menu or any suitable approach. For example, the user may define the checks based on the module (e.g., FIG. 14) or instance (FIG. 15). Verification process 10 may allow the user to define what kind of check he/she wants to be created. As such, the user may define just a segment in the RTL to enable/disable the DC/OC check creation (e.g., FIG. 16).

Figure 17:
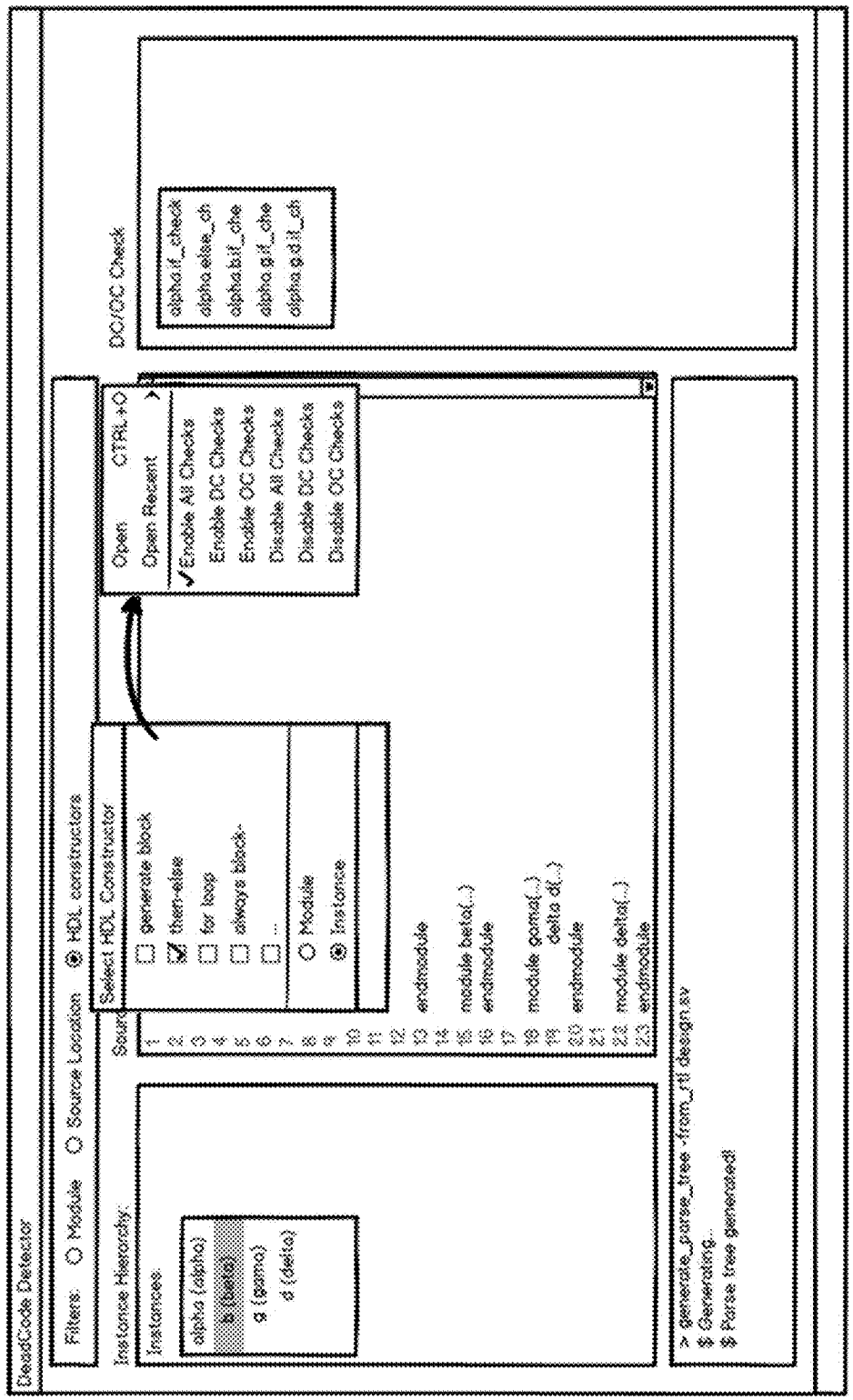
FIGS. 17-18 are examples of a graphical user interface consistent with the verification process in accordance with an embodiment of the present disclosure.
Figure 18:
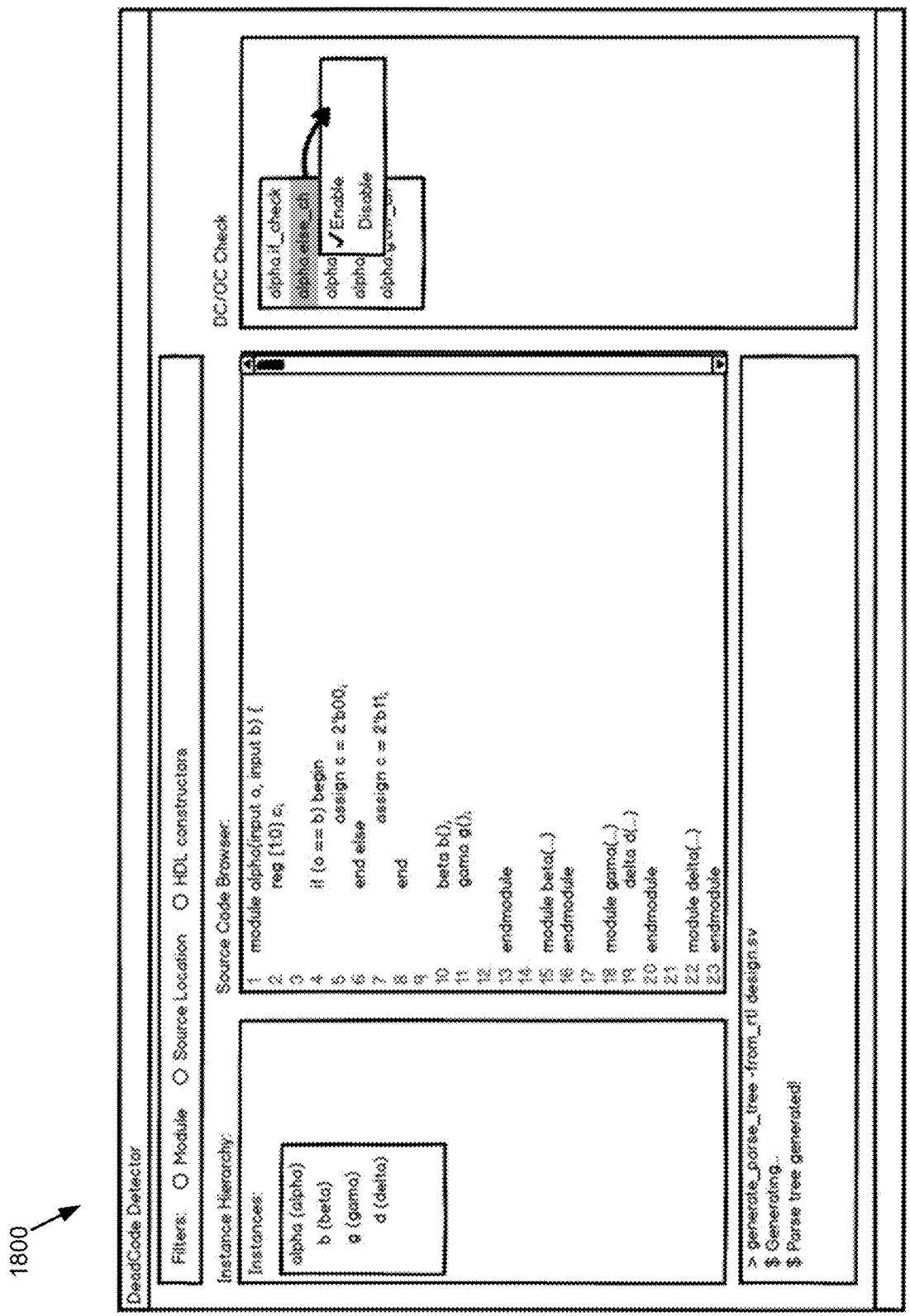

In some embodiments, the user may still define the checks according to the type of the HDL statement. FIG. 17 shows a GUI 1600 that allows a user to partially select DC/OC checks. FIG. 17 shows a GUI 1700 that allows a user to use a statement filter for DC/OC checks. The user may continue to define which individual checks he/she wants to be created and the user may individually enable/disable the DC/OC checks (e.g. FIG. 18). On the hierarchical view GUI, it may be possible to get metrics about the number of checks that will be generated. These metrics may be filtered by the same filtering mechanisms discussed earlier.

Embodiments of verification process 10 may utilize a less intrusive approach to the creation of deadcode checks that takes place on an earlier phase of the compilation process. Embodiments may include moving the creation prior to the synthesis phase and using the parse tree as the basis for identifying points of interest and constructing the checks. This is far simpler than doing this inside the synthesis process. Also, it is possible to use higher-level representations for the checks and to allow user-interaction, providing an early preview of the checks being created and options to filter, join or ignore uninterested checks.

Existing approaches may introduce automatic complex expression properties during a synthesis process, while verification process 10 may introduce a "cover (1)" property expression under interested nodes in parse tree. Verification process 10 may also include an early user inspection option to preview automatic properties before synthesizing them. In conventional implementations, the inspection flow only exists after synthesis.

Embodiments of verification process 10 may not modify the RTL synthesis flow itself. Instead, verification process 10 inserts a new step in the design compilation flow. Therefore, it is easier to maintain, which leads to a higher quality implementation.

Accordingly, verification process 10 may also improve the check's accuracy. Using the current approach, due to synthesis optimizations, some RTL branches might be optimized out by the synthesis tool. As such, existing approaches miss the deadcode checks for these branches. Verification process 10 does not suffer from this limitation, since it inserts the checks before the RTL synthesis flow.

Another advantage of verification process 10 is that it allows early preview of deadcode checks. Some features may include, but are not limited to, retrieving statistics per module instance, filter, join or ignore uninterested checks, manually insert new checks in selected parts of the design's RTL code, etc.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
   receiving, using a processor, a portion of an electronic circuit design;
   analyzing a syntactic structure of a string associated with the electronic circuit design;
   generating a parse tree, based upon, at least in part, the analysis;
   traversing the parse tree to identify one or more conditional nodes;
   generating a new node for each of the one or more conditional nodes; and
   displaying, at a graphical user interface, an option to define or select a check associated with at least one of the one or more conditional nodes or the new node prior to performing either register-transfer-level RTL synthesis or final synthesis.

2. The computer-implemented method of claim 1, wherein the string is based upon, at least in part, a grammar corresponding to a set of rules used to describe all possible strings of a programming language.

3. The computer-implemented method of claim 1, wherein the portion of an electronic circuit design includes an HDL file.

4. The computer-implemented method of claim 1, wherein the one or more conditional nodes represent at least one of a then path and an else path.

5. The computer-implemented method of claim 1, wherein the new node corresponds to an automatic reachability check.

6. The computer-implemented method of claim 1, wherein the parse tree includes at least one deadcode check.

7. The computer-implemented method of claim 6, further comprising:
   allowing a user to filter, using the graphical user interface, the at least one deadcode check.

8. A computer-readable storage medium, the computer-readable storage medium having stored thereon instructions that when executed by a machine result in one or more operations, the operations comprising:
   receiving, using a processor, a portion of an electronic circuit design;
   analyzing a syntactic structure of a string associated with the electronic circuit design;
   generating a parse tree, based upon, at least in part, the analysis;
   traversing the parse tree to identify one or more conditional nodes;
   generating a new node for each of the one or more conditional nodes; and
   displaying, at a graphical user interface, an option to define or select a check associated with at least one of the one or more conditional nodes or the new node prior to performing either register-transfer-level RTL synthesis or final synthesis.

9. The computer-readable storage medium of claim 8, wherein the string is based upon, at least in part, a grammar corresponding to a set of rules used to describe all possible strings of a programming language.

10. The computer-readable storage medium of claim 8, wherein the portion of an electronic circuit design includes an HDL file.

11. The computer-readable storage medium of claim 8, wherein the one or more conditional nodes represent at least one of a then path and an else path.

12. The computer-readable storage medium of claim 8, wherein the new node corresponds to an automatic reachability check.

13. The computer-readable storage medium of claim 8, wherein the parse tree includes at least one deadcode check.

14. The computer-readable storage medium of claim 13, further comprising: allowing a user to filter, using the graphical user interface, the at least one deadcode check.

15. A system comprising:
   a computing device having at least one processor configured to receive, using a processor, a portion of an electronic circuit design and to analyze a syntactic structure of a string associated with the electronic circuit design, the at least one processor further configured to generate a parse tree, based upon, at least in part, the analysis, the at least one processor further configured to traverse the parse tree to identify one or more conditional nodes and to generate a new node for each of the one or more conditional nodes, the at least one processor further configured to display, at a graphical user interface, an option to define or select a check associated with at least one of the one or more conditional nodes or the new node prior to performing either register-transfer-level RTL synthesis or final synthesis.

16. The system of claim 15, wherein the string is based upon, at least in part, a grammar corresponding to a set of rules used to describe all possible strings of a programming language.

17. The system of claim 15, wherein the portion of an electronic circuit design includes an HDL file.

18. The system of claim 15, wherein the one or more conditional nodes represent at least one of a then path and an else path.

19. The system of claim 15, wherein the new node corresponds to an automatic reachability check.

20. The system of claim 15, wherein the parse tree includes at least one deadcode check.

* * * * *